United States Patent [19]

Wakabayashi et al.

[11] Patent Number: 4,507,598
[45] Date of Patent: Mar. 26, 1985

[54] TWO-AXIS POSITIONING SYSTEM

[75] Inventors: Noriaki Wakabayashi, Hirakata; Kiichiro Yamada, Ibaraki; Hiromi Onodera, Hirakata, all of Japan

[73] Assignee: Matsushita Electric Industrial Co., Ltd., Kadoma, Japan

[21] Appl. No.: 486,971

[22] Filed: Apr. 20, 1983

[30] Foreign Application Priority Data

Apr. 21, 1982 [JP] Japan .................................. 57-67853

[51] Int. Cl.³ .............................................. G05B 11/00
[52] U.S. Cl. ....................................... 318/687; 318/38
[58] Field of Search .................................. 318/38, 687

[56] References Cited

U.S. PATENT DOCUMENTS

| | | | |
|---|---|---|---|
| 3,457,482 | 12/1969 | Sawyer | 318/687 |
| 3,832,610 | 8/1974 | Shimizu | 318/687 |
| 3,836,835 | 9/1974 | Sawyer | 318/687 X |
| 3,857,075 | 12/1974 | Sawyer | 318/38 |
| 3,878,411 | 4/1975 | Nocito | 318/38 |
| 3,940,676 | 2/1976 | Dudley | 318/38 |

Primary Examiner—B. Dobeck
Attorney, Agent, or Firm—Wenderoth, Lind & Ponack

[57] ABSTRACT

A two-axis positioning system comprising three linear motors, two of which are spaced at a predetermined interval and disposed movably in the direction of a first axis and another one of which is supported by two motors and made movable in the direction of a second axis, the three motors having position control loops independent of or related with each other corresponding to input movement command signals in the directions of the first and second axes.

3 Claims, 9 Drawing Figures

TWO-AXIS POSITIONING SYSTEM

BACKGROUND OF THE INVENTION

1. Field of the Invention

This invention relates to a two-axis positioning system, such as a XY plotter or XY table, usable in the field of measuring or control instruments, business machines or industrial machinery.

2. Description of the Prior Art

Conventionally, the two-axis positioning system used for positioning or freely moving the control object at or toward the desired position on the two-dimensional plane has often been so constructed that a rotary motor is used as an actuator for a driving mechanism so that the rotary motion of motor is changed into linear motion through a transmission mechanism, such as a belt, a steel wire or a ball screw, to move or position the position control object, for example, a pen block including a recording pen for the XY plotter, on the XY two-axis plane. Especially, in a case of fixing motors for the X axis and Y axis, two transmission mechanism becomes fairly complicated in construction. From the viewpoint of precise positioning or reliability for the two-axis positioning system, it is of course preferable to use the linear motor as the actuator, instead of the aforesaid transmission mechanism which converts the rotary motion into the linear motion.

FIG. 1 is a schematic perspective view of the conventional XY plotter which uses the drive mechanism of a linear pulse motor of open loop and simple in mechanism and drives the pen block directly in the two directions of the axes X and Y. In FIG. 1, reference numerals 1 and 2 designate a guiding stator and a X-axis movable element at a first X-axis linear pulse motor, the X-axis movable element 2 moving linearly along the guiding stator 1 in the direction of the X-axis (in the drawing, the direction of the arrow X); 3 and 4 designate a guiding stator and an X-axis movable element of a second X-axis linear pulse motor, the X-axis movable element 4 moving linearly along the guiding stator 3 in the direction of the axis X; 5 designates a guiding stator at a Y-axis linear pulse motor, which is mounted at both ends to the X-axis movable elements 2 and 4 moves together therewith in the direction of the axis X, 6 designates a Y-axis movable element at the Y-axis linear pulse motor, which moves linearly along the guiding stator 5 in the direction of the axis Y (in the drawing, the direction of the arrow Y) perpendicular to the X-axis; 7 designates a pen block mounted to the Y-axis movable element 6 and serving as the position control object; 8 designates a flat bed; 9 designates a recording paper; and 10 designates a frame supporting the guiding stators 1 and 3 at the first and second X-axis linear pulse motors and the flat bed 8. In addition, the linear pulse motor, when given one pulse, linearly moves the movable element only in a unit distance, the moving speed depending upon the number of input pulses within a period of unit time. The linear pulse motor, however, is of open-loop control system, whereby when intended to be abruptly accelerated or decelerated, it is liable to cause the pull out because of not completely following the input pulse, and also is very easy to do so during the high speed driving. Hence, the motor speed is limited in a fixed range to have been difficult to perform the high speed response and high speed operation. Furthermore, when one of two X-axis movable elements 2 and 4 at the XY plotter in FIG. 1 is subjected to an external force, the movable elements 2 and 4, which are essentially to operate in synchronism with each other, may cause the step out to lead to a shift in position. Once such condition occurs, the movable elements 2 and 4 connected by the guiding stator 5 cannot be restored in the original synchronism, thereby being twisted to be not easily movable. The twist, if intense, may jam the guiding stator 5. Thus, the system using the linear pulse motors have various defects.

SUMMARY OF THE INVENTION

An object of the invention is to provide a two-axis positioning system which uses linear motors as actuators without the use of a transmission mechanism converting the rotary motion into linear motion to materialize the high accuracy and reliability, and has no fear of creating the pull out, thereby being operable at high speed and high acceleration and expectable of smooth operation.

The two-axis positioning system of the invention comprises a first linear servomotor provided with a first guiding stator fixedly disposed in the direction of a first axis and a first movable element guided by the first guiding stator to be movable in the direction of the first axis, a second linear servomotor provided with a second guiding stator fixedly disposed in parallel to the first guiding stator and spaced therefrom at a given interval and a second movable element guided by the second guiding stator to be movable in the direction of the first axis, a third linear servomotor provided with a third guiding stator which extends in the direction of a second axis intersecting the first axis and is supported at both ends to the first and second movable elements and a third movable element guided by the thrid guiding stator to be movable in the direction of the second axis, a two-axis position control object mounted to the third movable element at the third linear servomotor, first and second closed-loop servo circuits which materializes the position control of the movable elements at the first and second linear servomotors following an input position command signal for assigning the two-axis position control object in position in the direction of the first axis, and a third closed-loop servo circuit which materializes the position control of the movable element at the third linear servomotor following an input position command signal for assigning the two-axis position control object in position in the direction of the second axis.

Also, the two-axis positioning system of the invention comprises a first linear servomotor provided with a first guiding stator fixedly disposed in the direction of the first axis and a first movable element guided by the first guiding stator to be movable in the direction of the first axis, a second linear servomotor provided with a second guiding stator fixedly disposed in parallel to the first guiding stator and spaced at the predetermined interval therefrom and a second movable element guided by the second guiding stator to be movable in the direction of the first axis, a third linear servomotor provided with a third guiding stator which extends in the direction of a second axis intersecting the first axis and is supported at both ends to the first and second movable elements and a third movable element guided by the third guiding stator to be movable in the direction of the second aixs, a two-axis position control object mounted to the third movable element at the third linear servomotor, a first closed-loop servo circuit which materizlizes the position control of the first movable element at the first linear servomotor following the input position control object in position in the direction of the first axis, a second closed-loop servo circuit which materializes the position control of the second movable element at the second linear servomotor following the position of the first movable element, and a third closed-loop servo circuit which materializes the position control of the movable element at the third linear servomotor following the input position command signal for assigning the two-axis position control object in position in the direction of the second axis.

Furthermore, the two-axis positioning system of the invention comprises a first linear servomotor provided with a first guiding stator fixedly disposed in the direction of a first axis and a first movable element guided by the first guiding stator to be movable in the direction of the first axis, a second linear servomotor provided with a second guiding stator extending in parallel to the first guiding stator and spaced therefrom at the predetermined interval and a second movable element guided by the second guiding stator to be movable in the direction of the first axis, a third linear servomotor provided with a third guiding stator which extends in the direction of a second axis intersecting the first axis and is supported at both ends to the first and second movable elements and a third movable element guided by the third guiding stator to be movable in the direction of the second axis, a two-axis position control object mounted to the third movable element at the third linear servomotor, a first closed-loop servo circuit which materializes the position control of the first movable element at the first linear servomotor following an input position command signal assigning the position of two-axis position control object in the direction of the first axis, a second closed-loop servo circuit which materializes the position control of the second movable element at the second linear servomotor following the position of the first movable element, a third closed-loop servo circuit which materializes the position control of the second movable element at the second linear servomotor following an input position command signal assigning the position of the two-axis position control object in the direction of the first axis, and a fourth closed-loop servo circuit which materializes the position control of the third movable element at the third linear servomotor following the input position command signal assigning the two-axis position control object in position in the direction of the second axis.

The two-axis positioning system of the invention is advantageous in that a plurality of linear servomotors are combined to constitute the drive mechanism and directly drive the control object, whereby the system of the invention needs no transmission mechanism complicated as in the conventional rotary motors and is of high accuracy and superior in the reliability, and that the motors are driven by the closed-loop servo system to prevent the danger of the occurrence of pull out as in the linear pulse motors so that the performance of high speed operation and high acceleration can be improved and also the system of the invention, when used for the apparatus, such as the XY plotter, can improve the plotting and wording speed and reduce the drafting time.

The two-axis positioning system of the invention disposes at one axis the third linear servomotor for directly driving the control object so as to perform the position control and at the other the first and second linear servomotors for directly driving the third linear servomotor including the control object as a whole, so that the first and second linear servomotors are closed-loop-controlled independently of each other following the input position command signal in the direction of the first axis, or one motor is closed-loop-controlled following the input position command signal and the other motor is closed-loop-controlled following the position of the one motor, or both the above control systems are practiced, thereby performing the position control. Hence, the synchronization of first and second linear servomotors is ensured and the mechanical disorder, such as a shift in position or twist, is eliminated to enable smooth operation.

The two-axis positioning system of the invention uses linear servomotors whose guiding stators and movable elements have magnetic teeth, and is provided at each movable element with a sensor for detecting the crests and roots of splines-like magnetic teeth at each stator, so that an electronic scale is constituting by use of an output from the sensor. Hence, a position detector, such as a linear encoder, indispensable to the closed-loop servo mechanism need not be provided separately from the linear servomotors, whereby the system can be materialized which is simple in construction, inexpensive to produce, and superior in mass productivity, and not inferior to the use of linear pulse motor applying the open-loop control. Especially, the system is the most suitable for a small-sized apparatus, for example, XY plotter, because a pen positioning mechanism itself should be small-sized and lightweight.

These and other objects of the invention will be seen by reference to the description taken in connection with the accompanying drawings.

DESCRIPTION OF THE PREFERRED EMBODIMENTS

Next, the embodiments of the two-axis positioning system of the invention will be detailed in accordance with FIGS. 2 through 8, in which the XY plotter is exemplary.

Figure 1:
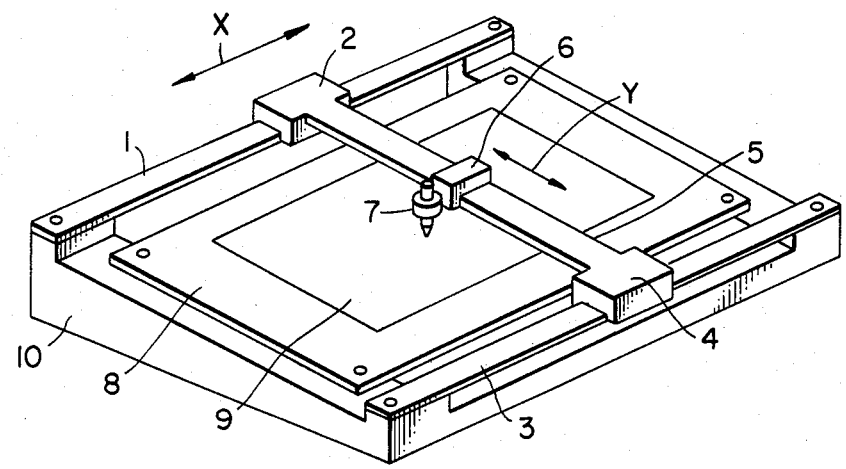
FIG. 1 is a schematic perspective view of a drive mechanism for a conventional XY plotter.
Figure 2:
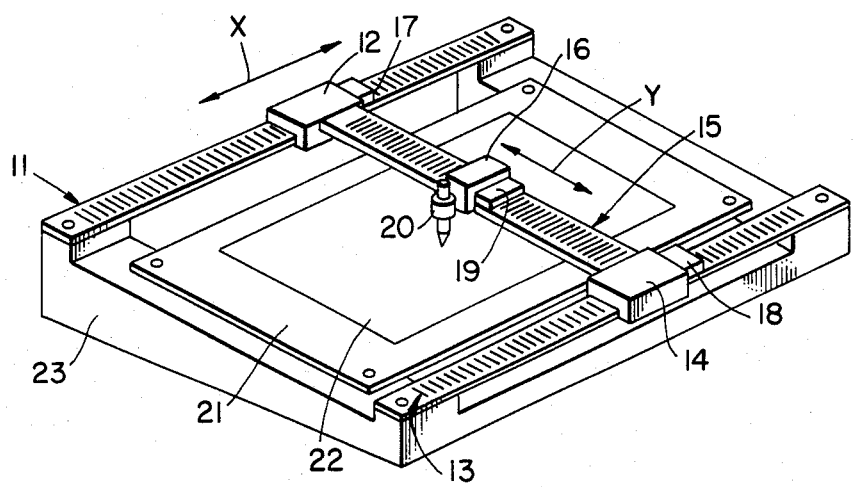
FIG. 2 is a schematic perspective view of a drive mechanism for a plotter in an embodiment of a two-axis positioning system of the invention, FIGS. 3-($a$) and -($b$) are schematic perspective views of a first X-axis linear servomotor in the FIG. 2 embodiment.

Referring to FIG. 2, reference numerals 11 and 12 designate a guiding stator and a X-axis movable element at a first X-axis linear servomotor, the X-axis movable element 12 moving linearly along the X-axis guiding stator 11 in the direction of the axis X (in the drawing, the direction of the arrow X), 13 and 14 designate a guiding stator and a X-axis movable element at a second X-axis linear servomotor, the X-axis movable element 14 moving linearly along the guiding stator 13 in the direction of the axis X, 15 designates a guiding stator mounted at both ends thereof to the X-axis movable elements 12 and 14 and moving together therewith in the direction of the axis X, 16 designates a Y-axis movable element at a Y-axis linear servomotor, the movable element 16 moving linearly along the Y-axis guiding stator 15 in the direction of the axis Y (in the drawing, the direction of the arrow Y) perpendicular to the axis X, 17 designates a first sensor block provided at the X-axis movable element 12, 18 designates a second sensor block provided at the X-axis movable element 14, 19 designates a third sensor block provided at the Y-axis movable element 16, 20 designates a pen block mounted to the Y-axis movable element 16, 21 designates a flat bed, and 23 designates a frame for supporting the guiding stators 11 and 13 and flat bed 21.

Figure 3A:
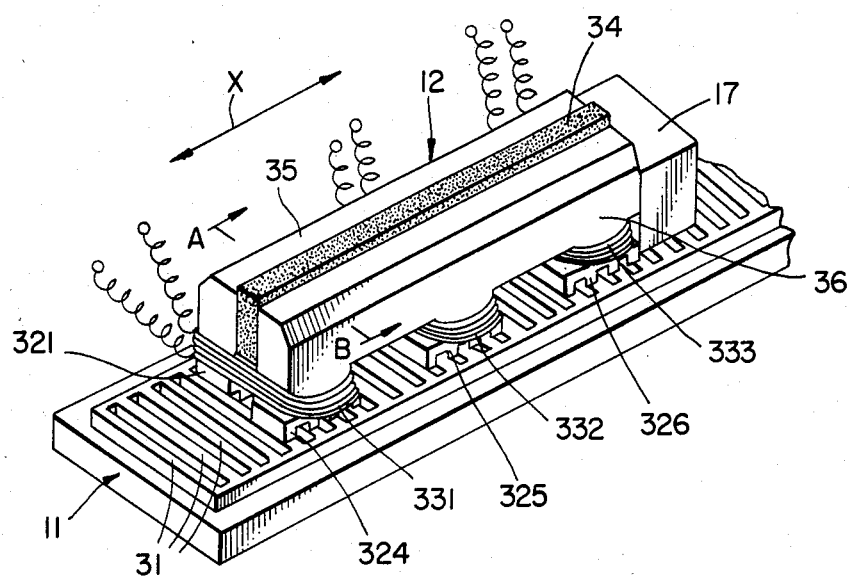
Figure 3B:
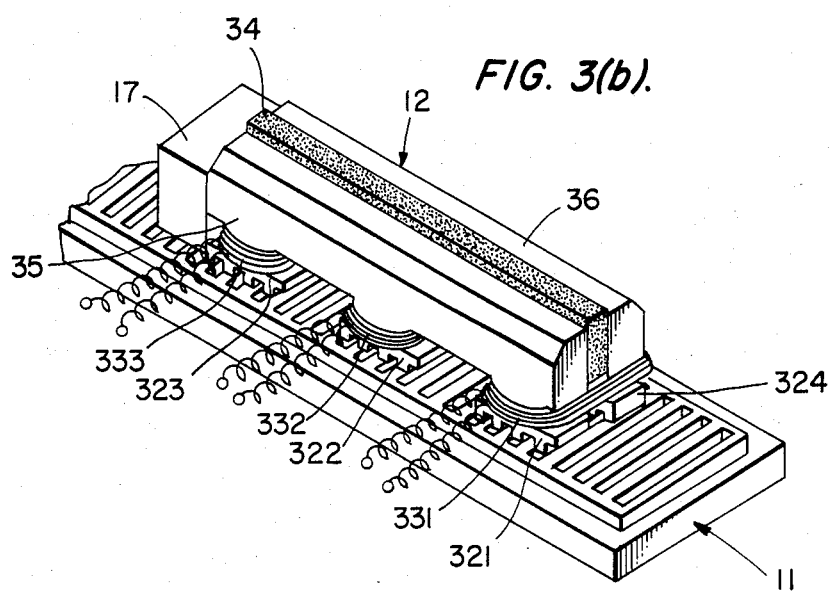
Figure 4:
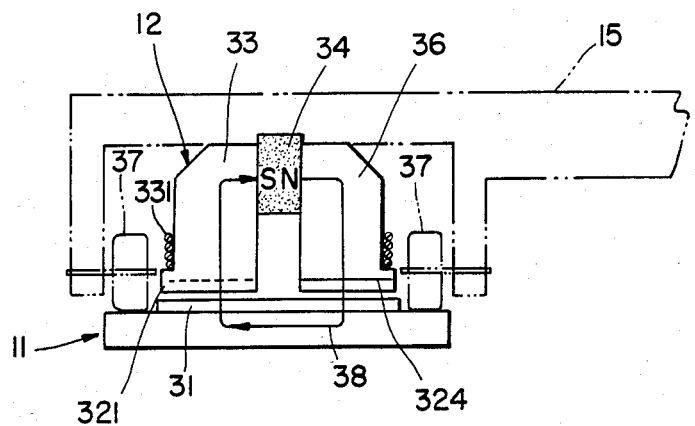
FIG. 4 is a sectional view taken on the line A–B in FIG. 3-($a$)

Referring to FIGS. 3-(a) and -(b) and 4, at the upper surface of guiding stator 11 are formed magnetic teeth 31 of spline-like shape and of a given pitch in the direction of axis X. Two rows of groups of spline-like shaped magnetic teeth 321, 322, 323, 324, 325 and 326 are provided at the surface of X-axis movable element 12 opposite to the upper surface of guiding stator 11, the groups of magnetic teeth 321, 322, 323, 324, 325 and 326 being opposite to the magnetic teeth 31 at a minute interval. In detail, the movable element 12 comprises a pair of iron cores 35 and 36 each having a group of three magnetic teeth 321, 322 and 323, or 324, 325 and 326 opposite at the surfaces to the magnetic teeth 31 of guiding stator 11 and shifted by a phase angle of 120° respectively, a permanent magnet 34 interposed between the pair of iron cores 35 and 36 and serving to supply bias magnetic flux, and three first coils 331, 332 and 333 would onto the groups of magnetic teeth 321 and 324, 322 and 325, and 323 and 326. The groups of magnetic teeth 321, 322 and 323, and 324, 325 and 326 have the phase relation of being shifted by 180° between the iron cores 35 and 36 respectively. The first sensor block 17 comprises a plurality of optical (or magnetic) sensor elements which detect the crest and roots at the splines of magnetic teeth 31 at the guiding stator 11 and output a plurality of periodical signals (position signal) like sinewave and different in phase relative to the position. In addition, reference numeral 37 designates bearings for guiding the X-axis movable element 12 in the direction of axis X, and the guiding stator 15 at the Y-axis linear servomotor and the bearings 37 are omitted from FIGS. 3-(a) and -(b).

Next, explanation will be given on the principle of operation of the first X-axis linear servomotor. Firstly, the permanent magnet 34 serves to apply bias magnetic flux in a fixed direction to gaps between the opposite surfaces of the magnetic teeth 31 at the guiding stator 11 and of the groups of magnetic teeth 321, 322, 323, 324, 325 and 326 at the X-axis movable element 12 respectively. Now, upon flowing an exciting current in the coil 331 to increase the magnetic flux applied to the gap between the magnetic teeth group 321 and the magnetic teeth 31, the magnetic flux generated by the exciting current superposes the bias magnetic flux 38 so that the magnetic flux between the magnetic teeth group 321 and the magnetic teeth 31 increases and simultaneously the magnetic flux at the gap between the magnetic teeth group 324 and the magnetic teeth 31 decreases. As a result, the magnetic teeth group 321 and magnetic teeth 31 attract each other so that the X-axis movable element 12 is intended to move to the position where reactance of the gap becomes minimal. Next, flowing an exciting current in the coil 332 to increase the magnetic flux applied in the gap between the group of magnetic teeth 322 and the magentic teeth 31, the magentic flux generated by the exciting current superposes the bias magnetic flux 38 so that the magnetic flux in the gap between the group of magnetic teeth 322 and the magnetic teeth 31 increases and simultaneously the magnetic flux to the gap between the group of magnetic teeth 325 and the magnetic teeth 31 decreases. As a result, the group of magnetic teeth 322 and magnetic teeth 31 attract each other and the X-axis movable element 12 is intended to move to the position where reactance of the gap becomes minimal. Subsequently, the coils 333, 331, 332 . . . ., as the same as the above, are switched of energization in continuation, thereby enabling the X-axis movable element 12 to move continuously. Thus, upon moving the X-axis movable element 12 in continuation, an output of the first sensor block 17 shows a signal like sinewave (to be hereinafter called the position signal). Also the coils 331, 332 and 333 perform through the position control unit the current-feeding by an electronic commutator so that the exciting current flows while being switched sequentially following the position signal from the first sensor block 17.

Incidentally, the second X-axis linear servomotor and Y-axis linear servomotor are about the same in the principle and construction as the first X-axis linear servomotor, thereby being omitted of description herein.

The XY plotter of the invention as abovementioned linearly drives the pen block 20 directly by the Y-axis linear servomotor which is driven at both ends in parallel by the first and second X-axis linear servomotors. Since the pen block 20 as the position control object is coupled with the Y-axis linear servomotor with respect to displacement in the direction of axis X, the X-axis linear servomotor in fact may be deemed to directly linearly drive the pen block 20. The first and second X-axis linear servomotors, which drive the position control object together with the Y-axis linear servomotor, require thrust larger than that by the Y-axis linear servomotor, whereby the two linear servomotor parallel-drive system is superior in the improved thrust and also the mechanical balance.

Thus, the XY plotter of the invention, which directly drives the position control object, is superior in the accuracy and reliability, has no fear of the occurrence of pull out, and ensures operation at high speed and high acceleration, but is difficult to expect an improvement in accuracy unless the first and second X-axis linear servomotors are driven completely in synchronization. Especially, in the extreme, the X-axis movable elements 12 and 14 at two X-axis linear servomotors are connected with each other by the guiding stator 15, thereby occasionally causing the twisting to be not easily movable. This embodiment, however, can easily drive the first and second linear servomotors in synchronization because they are of closed-loop servosystem, thereby avoiding the occurrence of the above matter.

Figure 5:
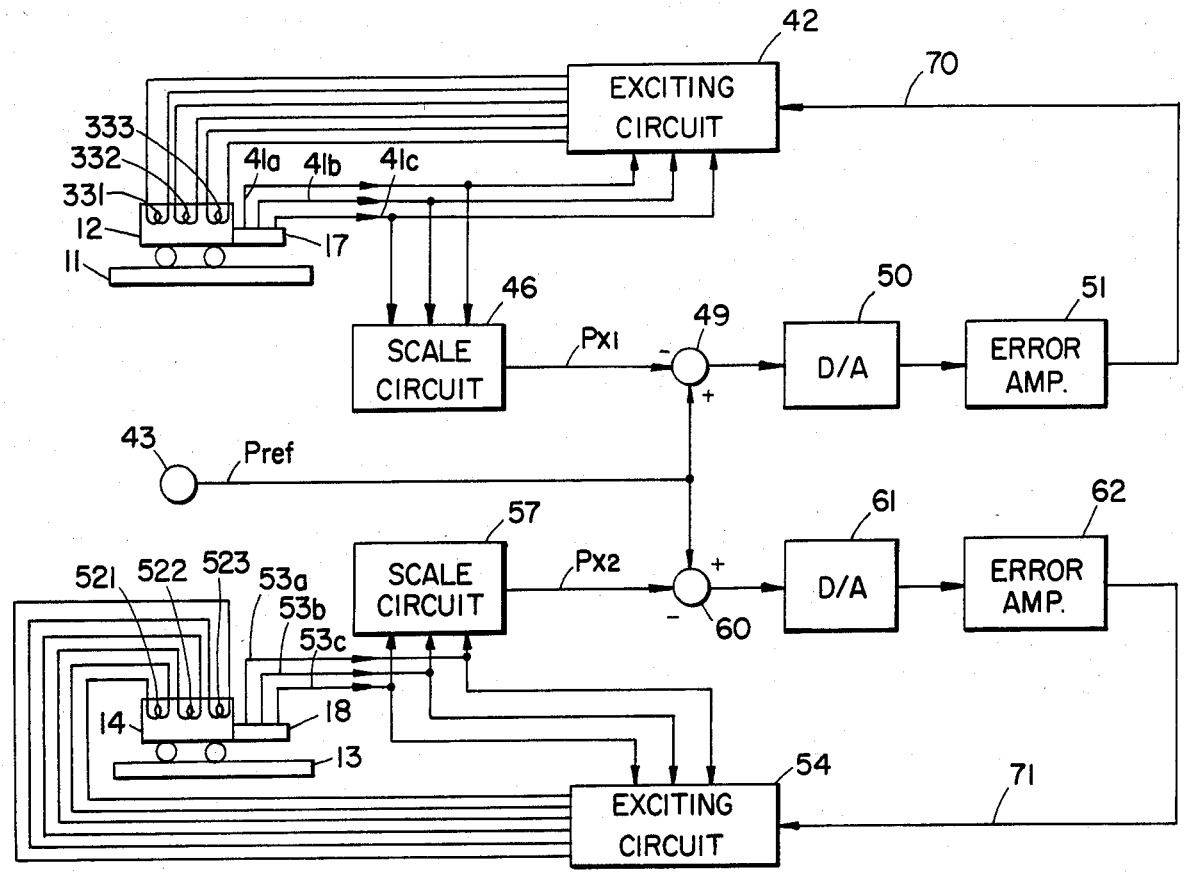
FIG. 5 is a block diagram of a position control unit for the X-axis linear servomotor.

Next, explanation will be given on an embodiment of the position control unit constituting a closed-loop serve circuit comprising the first and second sensor blocks. FIG. 5 is the block diagram of the position control unit for first and second linear servomotors, in which reference numerals 41a, 41b and 41c designate position signals output from the first sensor block 17 and for recognizing the crests and roots of magnetic teeth 31 at the guiding stator 11; 42 designates a first electronic commutator type exciting circuit of non-contact, which comprises electronic switches for switching the exciting phase of each first coil 331, 332 ro 333 at the first X-axis linear servomotor sequentially corresponding to the position in response to each position signal 41a, 41b or 41c; 46 designates a first electronic scale circuit detecting by the high resolving power the position of X-axis movable element 12 from three position signals 41a, 41b and 41c; 43 designates an input terminal given an input X-axis position command signal Pref; 49 designates a first subtracter to fetch a difference between the input X-axis position command signal Pref and the position information PX1 of output of the first electronic scale circuit 46; 50 designates a first D/A converter for analog-converting the output of subtracter 49; 51 designates a first error amplifier including function to amplify an output of first D/A converter 50 and properly decide the negative feedback gain of closed-loop servo, the output becoming a drive output 70 for the first electronic commutator type exciting circuit.

In such construction, the first X-axis linear servomotor is controlled by the closed-loop servo according to the input X-axis position command signal.

Reference numerals 53a, 53b and 53c designate position signals from the second sensor block 18 for recognizing the crests and roots of magnetic teeth at the guiding stator 13; 54 designates a second electronic commutator type exciting circuit of non-contact; 521, 522 and 523 designate second field coils provided at the X-axis movable element 14 at the second X-axis linear servo motor, which correspond to the first coils 331, 332 and 333 at the first X-axis linear servomotor respectively; 57 designates a second electronic scale circuit corresponding to the first electronic scale circuit; 60 designates a second subtracter which fetches a difference between the input X-axis position command signal Pref. and the output position information PX2 of second electronic scale circuit 57; 61 designates a second D/A converter, and 62 designates a second error amplifier, the output of which becomes an output for exciting the second electronic commutator type drive circuit 54.

In such construction, the second X-axis linear servomotor also is closed-loop-servo-controlled according to the input X-axis position command signal Pref.

In detail, the first electronic commutator type drive circuit 42 in FIG. 5 switches the exciting phase of first coil 331, 332 or 333 on the basis of magnitude of each position signal 41a, 41b or 41c. This switching method is the well-known electronic commutator method using electronic switches which excite in order the coils 331, 332 and 333 decided corresponding to the position, not through the mechanical contacts, but by electrical signals (position signals), at which time the intensity of exciting current is decided in proportion to magnitude of exciting output 70. Since the first coils 331, 332 and 333 are decided corresponding to the position of X-axis movable element 12, the exciting current is supplied by the electronic commutator, so that when the X-axis movable element 12 is intended to move in a certain direction, the thrust uniform in the fixed direction can be always generated in any condition, in which there is no fear of causing the pull out as in the pulse motor, the second electronic commutator type exciting circuit 46 having the same function as the above.

Figure 6:
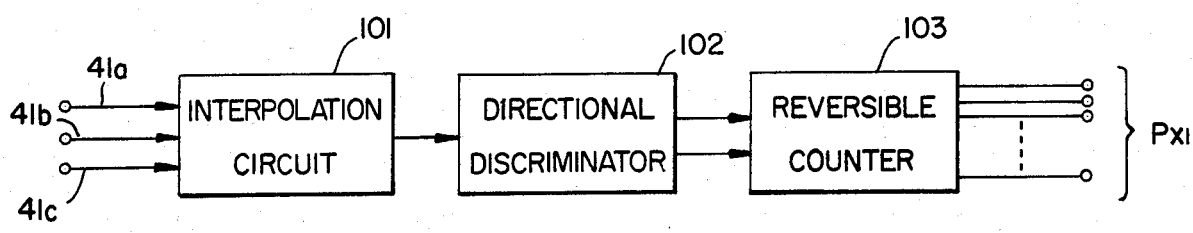
FIG. 6 is a structural view of the principal portion of the position control system in FIG. 5, and FIGS. 7 and 8 are block diagrams of modified embodiments of the position control unit in FIG. 5.

The first electronic scale circuit 46 uses the aforesaid position signals 41a, 41b and 41c to detect the position of X-axis movable element 12 by the high resolving power, the principal construction of electronic scale circuit 46 being shown in FIG. 6, in which reference numeral 101 designates a first interpolation circuit which carries out the interpolation in one cycle period (corresponding to one pitch of magnetic teeth 31) on a basis of the position signals 41a, 41b and 41c like sine-wave to thereby detect the position by fine resolving power; 102 designates a first directional discriminator which discriminates the moving direction of X-axis movable element 12 from the output of the first interpolation circuit 101; and 103 designates a first reversible counter which accumulatively reversibly counts the position pulse directionally discriminated from the first directional discriminator circuit 102 (the position pulse, for example, becomes up-count pulse and down-count pulse discriminated by the moving direction of movable element), the output of first reversible counter 103 being the aforesaid position information PX1. The second electronic scale circuit 57 is constructed as the same as the first electronic scale circuit 46, that is, it comprises a second interpolation circuit, a second directional discriminator circuit and a second reversible counter. In addition, the first and second electronic scale circuits 46 and 57 concretely are applicable of the method disclosed in the inventor's prior application: Japanese Utility Model Application No. Sho 57-4058.

Thus, the embodiment of the position control unit for the X-axis linear servomotor at the aforesaid two-axis positioning system of the invention controls the first and second X-axis linear servomotors in closed-loop servo control independently of each other following the input X-axis position command signal Pref., thereby avoiding a twist or a shift in position caused by the pull out or step out of one motor as in the conventional linear pulse motors.

Figure 7:
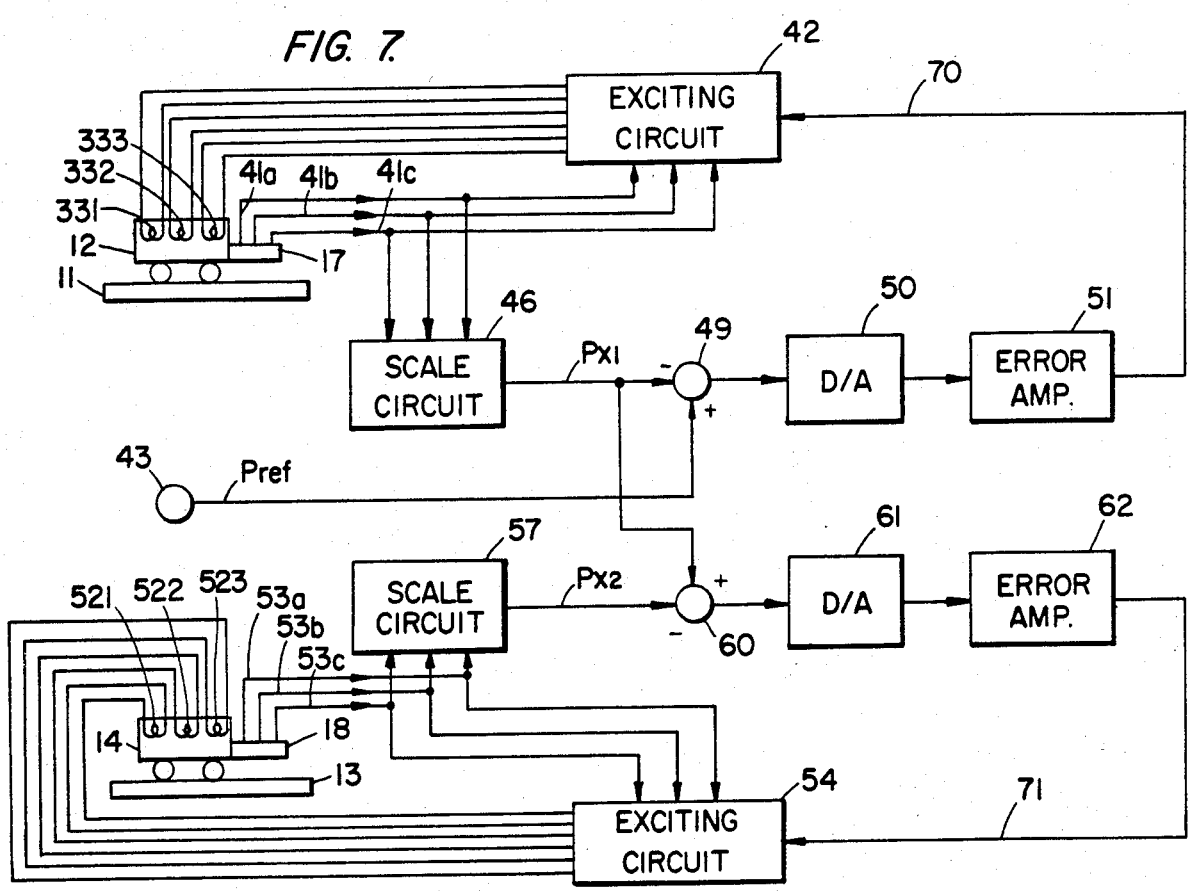
Figure 8:
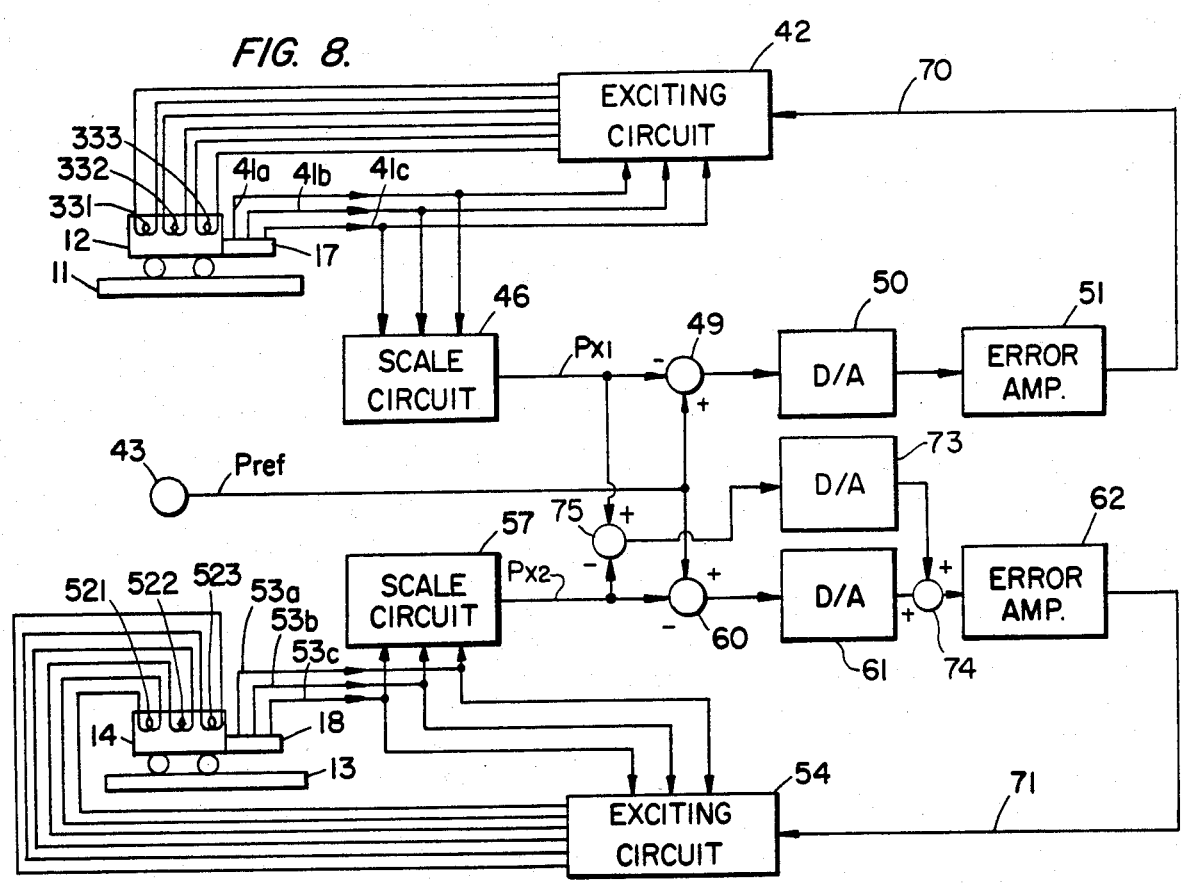

In order to ensure the synchronization (parallel running without creating a shift in position) of two X-axis linear servomotors, the modified embodiments of position control unit for the X-axis linear servomotors at the two-axis positioning system of the invention may, as shown in FIGS. 7 and 8, be proposed. Incidentally, the embodiments in FIGS. 7 and 8 are different only in construction of closed-loop servo system from FIG. 5, whereby the components with the same function as those in FIG. 5 are designated by the same reference numerals and omitted of description herein.

Firstly, explanation will be given on the construction and operation of position control unit in FIG. 7. The X-axis linear servomotor is recognized of its position as the position information PX1 by a first electronic scale circuit 46. A difference between the input X-axis position command signal Pref and the position information PX1 is amplified by a first error amplifier 51 through a first D/A converter 50 and then given as an input 70 to a first electronic commutator type exciting circuit 42. In such construction, the first X-axis linear servomotor is closed-loop-servo-controlled following the input X-axis command signal Pref. While, in the second X-axis linear servomotor, a difference between the position information PX1 and PX2 of first and second electronic scale circuits 46 and 57 is given as an input 71 to a second electronic commutator type exciting circuit 54 through a second D/A converter 61 and a second error amplifier 62. Hence, the second X-axis linear servomotor is closed-loop-controlled to follow the position information PX1, i.e., the position of X-axis movable element at the first X-axis linear servomotor, thereby making it possible to operate the X-axis movable elements 12 and 14 in synchronization with higher accuracy than that in FIG. 5.

Next, the position control unit in FIG. 8 comprises the components in FIG. 5 added with a third subtracter 75 for fetching a difference between the position information PX1 in the output of first electronic scale circuit 46 and that PX2 in the output of second electronic scale circuit 57, a third D/A converter 73, and an adder 74 adding the outputs of second and third D/A converters 61 and 73. In FIG. 8, the first X-axis linear servomotor is controlled as quite the same as the position control unit in FIG. 5 so that the closed-loop position servo system is constituted to control the position of the motor according to the input X-axis position command signal Pref. While, the second X-axis linear servomotor outputs the difference between the position informations PX1 and PX2 of first and second electronic scale circuits 46 and 57 through the third D/A converter and that between the position information PX2 and the input X-axis position command signal Pref through the second D/A converter 61, both the differences being added by the adder 74. The output of adder 74 is given as an input 71 to a second electronic commutator type exciting circuit 54. Hence, the second X-axis linear servomotor is closed-loop-controlled by the element following the position of X-axis movable element 12 at the first X-axis linear servomotor and that following the input X-axis position command signal Pref, thereby enabling operations of X-axis movable elements 12 and 14 in synchronization with higher accuracy than that in FIG. 7.

The position control unit for the Y-axis linear servomotor at the two-axis positioning system of the invention is of construction basically the same as the closed-loop control circuit for the first or second X-axis linear servomotor at the position control unit for the X-axis linear servomotor shown in the FIG. 5 embodiment, whereby the description of the construction according to the drawing is omitted. The Y-axis linear servomotor has a third electronic scale circuit comprising a third interpolation circuit, a third directional discriminator circuit and a reversible counter so as to be controlled following the input Y-axis position command signal and generally actuated independently of the X-axis linear servomotor, and similarly forms the closed-loop servo and is position-controlled.

In the above embodiment, the first to third linear servomotors each have three phases and three coils, and the first to third sensor blocks output three signals different in phase, which are not to be defined to three. Also, the construction of magnetic circuit at the motor is not defined to the above embodiment and it is not related to the principle of the invention whether or not the permanent magnet is used.

Also, the two axes in the embodiments comprise the axes X and Y in the so-called the pair of coordinate axes, but they should not be defined thereto.

Although several embodiments have been described, they are merely exemplary of the invention and not to be constructed as limiting, the invention being defined solely by the appended claims.

What is claimed is:

1. A two-axis positioning system comprising: a first linear servomotor provided with a first guiding stator fixedly disposed in the direction of a first axis and a first movable element guided by said first guiding stator to be movable in the direction of the first axis; a second linear servomotor provided with a second guiding stator fixedly disposed in parallel to said first guiding stator and spaced therefrom at the predetermined interval and a second movable element guided by said second guiding stator to be movable in the direction of the first axis; a third linear servomotor provided with a third guiding stator which extends in the direction of a second axis intersecting said first axis and is supported to said first and second movable elements and a third movable element guided by said third guiding stator to be movable in the direction of the second axis; a two-axis position control object mounted to said third movable element at said third linear servomotor; first and second closed-loop servo circuits materializing position control for said movable elements at said first and second linear servomotors following an input position command signal which assigns the position of said two-axis position control object in the direction of the first axis, and a third closed-loop servo circuit materializing the position control for said movable element at said third linear servomotor following the input position command signal which assigns the position of said two-axis position control object in the direction of the second axis;

wherein said first, second and third linear servomotors are provided with first, second and third position detecting sensor means which output position signals corresponding to the position of said first movable element with respect to said first guiding stator, the position of said second movable element with respect to said second guiding stator, and the position of said third movable element with respect to said third guiding stator respectively, and first, second and third electronic scale circuits for measuring the position on a basis of the signals from said position detecting sensor means respectively, said first and second guiding stators including magnetic materials each extending in the direction of the first axis, said third guiding stator including magnetic material extending in the direction of the second axis, said magnetic materials each comprising a plurality of magnetic teeth of spline-like shape and in the fixed pitch, said first, second and third movable elements each including a plurality of coils and magnetic materials formed in a plurality of groups of magnetic teeth of spline-like shape, each of said groups of magnetic teeth being disposed opposite to said first, second and third guiding stators at fixed intervals respectively, said first, second and third position detecting sensor means including a plurality of sensor elements which detect the crests and roots of said spline-like shaped magnetic teeth at said first, second and third guiding stators and output a plurality of position signals periodical and like sinewave and different in phase with regard to the position, said first, second and third electronic scale circuits comprising; first, second and third interpolation circuits which detect by fine resolution the positions of said first, second and third movable elements on the basis of position signals output from said sensor elements at said first, second and third movable elements respectively; first, second and third directional discriminator circuits which discriminate the direction of each of said movable elements; and first, second and third counters which reversibly count said directionally discriminated pulses.

2. A two-axis positioning system comprising: a first linear servomotor provided with a first guiding stator fixedly disposed in the direction of a first axis and a movable element guided by said first guiding stator to be movable in the direction of the first axis; a second linear servomotor provided with a second guiding stator fixedly disposed in parallel to said first guiding stator and spaced therefrom at the predetermined interval and a second movable element guided by said second guiding stator to be movable in the direction of the first axis; a third linear servomotor provided with a third guiding stator which extends in the direction of a second axis intersecting said first axis and is supported to said first and second movable elements and a third movable element guided by said third guiding stator to be movable in the direction of the second axis; a two-axis position control object mounted to said third movable element at said third linear servomotor; a first closed-loop servo circuit materializing the position control for said first movable element at said first linear servomotor following an input position command signal which assigns the position of said two-axis position control object in the direction of the first axis; a second closed-loop servo circuit which materializes the position control for said second movable element at said second linear servomotor following the position of said first movable element; and a third closed-loop servo circuit which materializes the position control of said third movable element at said third linear servomotor following the input position command signal which assigns the position of said two-axis position control object in the direction of the second axis;

wherein said first, second and third linear servomotors are provided with first, second and third position detecting sensor means which output position signals corresponding to the position of said first movable element with respect to said first guiding stator, the position of said second movable element with respect to said second guiding stator, and the position of said third movable element with respect to said third guiding stator respectively, and first, second and third electronic scale circuits for measuring the position on a basis of the signals from said position detecting sensor means respectively, said first and second guiding stators including magnetic materials each extending in the direction of the first axis, said third guiding stator including magnetic material extending in the direction of the second axis, said magnetic materials each comprising a plurality of magnetic teeth of spline-like shape and in the fixed pitch, said first, second and third movable elements each including a plurality of coils and magnetic materials formed in a plurality of groups of magnetic teeth of spline-like shape, each of said groups of magnetic teeth being disposed opposite to said first, second and third guiding stators at fixed intervals respectively, said first, second and third position detecting sensor means including a plurality of sensor elements which detect the crests and roots of said spline-like shaped magnetic teeth at said first, second and third guiding stators and output a plurality of position signals periodical and like sinewave and different in phase with regard to the position, said first, second and third electronic scale circuits comprising; first, second and third interpolation circuits which detect by fine resolution the positions of said first, second and third movable elements on the basis of position signals output from said sensor elements at said first, second and third movable elements respectively; first, second and third directional discriminator circuits which discriminate the direction of each of said movable elements; and first, second and third counters which reversibly count said directionally discriminated pulses.

3. A two-axis positioning system comprising: a first linear servomotor provided with a first guiding stator fixedly disposed in the direction of a first axis and a first movable element guided by said first guiding stator to be movable in the direction of the first axis; a second linear servomotor provided with a second guiding stator fixedly disposed in parallel to said first guiding stator and spaced therefrom at a predetermined interval and a second movable element guided by said second guiding stator to be movable in the direction of the first axis; a third linear servomotor provided with a third guiding stator which extends in the direction of a second axis intersecting said first axis and is supported to said first and second movable elements and a third movable element guided by said third guiding stator to be movable in the direction of the second axis; a two-axis position control object mounted to said third movable element at said third linear servomotor; a first closed-loop servo circuit which materializes the position control of said first movable element at said first linear servomotor following an input position command signal which assigns the position of said two-axis position control object in the direction of the first axis; a second closed-loop servo circuit which materializes the position control for said second movable element at said linear servomotor following the position of said first movable element; a third closed-loop servo circuit which materializes the position control of said second movable element at said second linear servomotor following the input position command signal which assigns the position of said two-axis position control object in the direction of the first axis; and a fourth closed-loop servo circuit which materializes the position control of said third movable element at said third linear servomotor following the input position command signal which assigns the position of said two axis position control object in the direction of the second axis;

wherein said first, second and third linear servomotors are provided with first, second and third position detecting sensor means which output position signals corresponding to the position of said first movable element with respect to said first guiding stator, the position of said second movable element with respect to said second guiding stator, and the position of said third movable element with respect to said third guiding stator respectively, and first, second and third electronic scale circuits for measuring the position on a basis of the signals from said position detecting sensor means respectively, said first and second guiding stators including magnetic materials each extending in the direction of the first axis, said third guiding stator including magnetic material extending in the direction of the second axis, said magnetic materials each comprising a plurality of magnetic teeth of spline-like shape and in the fixed pitch, said first, second and third movable elements each including a plurality of coils and magnetic materials formed in a plurality of groups of magnetic teeth of spline-like shape, each of said groups of magnetic teeth being disposed opposite to said first, second and third guiding stators at fixed intervals respectively, said first, second and third position detecting sensor means including a plurality of sensor elements which detect the crests and roots of said spline-like shaped magnetic teeth at said first, second and third guiding stators and output a plurality of position signals periodical and like sinewave and different in phase with regard to the position, said first, second and third electronic scale circuits comprising; first, second and third interpolation circuits which detect by fine resolution the positions of said first, second and third movable elements on the basis of position signals output from said sensor elements at said first, second and third movable elements respectively; first, second and third directional discriminator circuits which discriminate the direction of each of said movable elements; and first, second and third counters which reversibly count said directionally discriminated pulses.

* * * * *